United States Patent
Frenger et al.

(10) Patent No.: US 10,064,086 B2
(45) Date of Patent: *Aug. 28, 2018

(54) SIGNALING OF SYSTEM INFORMATION TO MTC-DEVICES

(71) Applicant: TELEFONAKTIEBOLAGET LM ERICSSON (PUBL), Stockholm (SE)

(72) Inventors: Pål Frenger, Linköping (SE); Erik Eriksson, Linköping (SE); Johan Bergman, Stockholm (SE); Robert Baldemair, Solna (SE); Konstantinos Dimou, San Francisco, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/376,852

(22) Filed: Dec. 13, 2016

(65) Prior Publication Data
US 2017/0135026 A1  May 11, 2017

Related U.S. Application Data

(63) Continuation of application No. 13/980,986, filed as application No. PCT/SE2013/050745 on Jun. 20, 2013, now Pat. No. 9,668,162.

(Continued)

(51) Int. Cl.
*H04W 48/12*   (2009.01)
*H04W 56/00*   (2009.01)
(Continued)

(52) U.S. Cl.
CPC ......... *H04W 28/0215* (2013.01); *H04W 4/70* (2018.02); *H04W 48/06* (2013.01);
(Continued)

(58) Field of Classification Search
CPC ..... H04W 48/02; H04W 12/08; H04W 28/18; H04W 36/0061; H04W 36/08; H04W 48/06; H04W 76/027; H04L 63/105
See application file for complete search history.

(56) References Cited

U.S. PATENT DOCUMENTS 6,628,946 B1 *  9/2003  Wiberg ................. H04W 48/12
                                                  455/434
7,512,145 B2    3/2009  Kim
(Continued)

FOREIGN PATENT DOCUMENTS

JP    2001-244873 A    9/2001
JP    2010-504031 A    2/2010
(Continued)

OTHER PUBLICATIONS

Anna Larmo, RAN Overload Control for Machine Type Communication in LTE, IEEE, 2012.*
(Continued)

*Primary Examiner* — Ayaz Sheikh
*Assistant Examiner* — Debebe Asefa

(57) ABSTRACT

Network node and UE, and methods therein for signaling system information, SI, to UEs. The method in the network node comprises transmitting SI to one or more UEs, where the SI comprises multiple alternative sets, where each set assigns different values to one or multiple radio system parameters. The method further comprises determining which set, out of the multiple alternative sets, that should currently be applied for a UE, and transmitting an SI selection signal to the UE, the SI selection signal indicating the determined set, thus enabling the UE to apply currently appropriate radio system parameters also in unfavorable radio conditions. The UE may be an MTC device (Machine Type Communication).

22 Claims, 7 Drawing Sheets

Related U.S. Application Data

(60) Provisional application No. 61/811,903, filed on Apr. 15, 2013.

(51) Int. Cl.
| | | |
|---|---|---|
| *H04W 4/00* | (2018.01) | |
| *H04W 48/06* | (2009.01) | |
| *H04W 48/08* | (2009.01) | |
| *H04W 4/70* | (2018.01) | |
| *H04W 28/02* | (2009.01) | |
| *H04W 4/06* | (2009.01) | |

(52) U.S. Cl.
CPC ........... *H04W 48/08* (2013.01); *H04W 48/12* (2013.01); *H04W 56/0025* (2013.01); *H04W 4/06* (2013.01)

(56) References Cited

U.S. PATENT DOCUMENTS

| | | | |
|---|---|---|---|
| 8,868,743 | B2 | 10/2014 | Park |
| 8,934,846 | B2 | 1/2015 | Jung et al. |
| 2003/0147371 | A1* | 8/2003 | Choi et al. .................... 370/341 |
| 2008/0075043 | A1 | 3/2008 | Wang et al. |
| 2011/0201307 | A1 | 8/2011 | Segura |
| 2012/0033646 | A1 | 2/2012 | Luo et al. |
| 2012/0039171 | A1 | 2/2012 | Yamada et al. |
| 2012/0051297 | A1 | 3/2012 | Lee et al. |
| 2013/0045706 | A1 | 2/2013 | Hsu |
| 2013/0281090 | A1* | 10/2013 | Maeda .................. H04W 48/02 455/434 |
| 2013/0288694 | A1* | 10/2013 | Mochizuki et al. .......... 455/450 |
| 2014/0031031 | A1* | 1/2014 | Gauvreau et al. ......... 455/426.1 |
| 2014/0064067 | A1* | 3/2014 | Drewes et al. ............... 370/230 |

FOREIGN PATENT DOCUMENTS

| | | |
|---|---|---|
| WO | 2008/033463 A1 | 3/2008 |
| WO | 2012/84001 | 6/2012 |
| WO | 2013/170424 A1 | 11/2013 |
| WO | WO 2013170424 A1 * | 11/2013 |

OTHER PUBLICATIONS

ETSI TS 136.331 V11.2.0 (Feb. 2013); Technical Specification; LTE; Evolved Universal Terrestrial Radio Access (E-UTRA); Radio Resource Control (RRC); Protocol specification (3GPP TS 36.331 version 11.2.0 Release 11).

3GPP TS 36.331 V11.5.0 (Sep. 2013); 3rd Generation Partnership Project; "Technical Specification Group Radio Access Network/" Evolved Universal Terrestrial Radio Access (E-UTRA); Radio Resource Control (RRC); Protocol specification (Release 11).

Vodafone: "Updated SID on: Provision of low-cost MTC UEs based on LTE;" RP-121441; TSG RAN meeting #57, Chicago, USA; Sep. 4-7, 2012.

Larmo, Anna, et al.; "RAN overload control for Machine Type Communications in LTE;" GLOBECOM Workshops; 2012 IEEE; Dec. 3, 2012; pp. 1626-1631; XP032341629; ISBN: 978-1-4673-4942-0.

Jain, Puneet, et al.; "Machine type communications in 3GPP systems;" IEEE Communications Magazine, IEEE Service Center, Piscataway, US; vol. 50, No. 11, Nov. 1, 2012; pp. 28-35 XP011472332; ISSN: 0163-6804.

Ericsson, ST-Ericsson; "Extended access barring for MTC devices," 3GPP TSG-RAN WG2#74, R2-113030, May 3, 2011.

* cited by examiner

SIGNALING OF SYSTEM INFORMATION TO MTC-DEVICES

CROSS-REFERENCE TO RELATED APPLICATIONS

This application is a continuation of U.S. patent application Ser. No. 13/980,986, filed Jul. 22, 2013, which is a National Stage Entry of PCT/SE2013/050745, filed Jun. 20, 2013, which claims priority from Provisional Application No. 61/811,903, filed Apr. 15, 2013, the disclosures of which are incorporated herein by reference.

TECHNICAL FIELD

The invention relates generally to system information in a wireless communications system, and in particular to signaling of system information to UEs (User Equipments), such as MTC-devices.

BACKGROUND

Machine Type Communications (MTC or M2M) is expanding rapidly and has the potential to generate significant revenues for mobile network operators. MTC Devices are expected to outnumber voice subscribers by at least two orders of magnitude. Some predictions are much higher. MTC enables machines to communicate directly with one another. M2M communication has the potential to radically change the world around us and the way that people interact with machines.

As technology evolves, there are important changes in capabilities and costs. More computing power, memory and communication capabilities make it possible for machines to perform some tasks which were previously performed by human beings. The use of machines instead of human labor is often associated with lower costs. Increasing capabilities and lower costs together may open new opportunities for revenue generating services, which were not previously provided for economical reasons.

MTC devices may be providing a wide variety of features. In the area of home automation, the MTC devices may be providing sensor capabilities such as, sensing temperature, humidity, open/closed/locked doors or windows, energy meters, water meters and similar, as well as various actuators such as for turning on heater/cooler, switching lights or pumps on/off, and similar applications related to home and workplace automation. Another area that can use machine to machine communication is security and surveillance related to homes and offices. Various sensors such as motion sensors, smoke detectors, cameras, etc, are connected to local or central security systems, which in turn are connected to actuators such as sirens, sprinklers, speakers, etc. Another area is automotive where vehicles may include a wide range of different kind of sensors and actuates. Another area is transportation and logistics where both logistics centers as well as vehicles for transportation may contain both sensors and actuators for tracking of or creation of documents at certain toll gates. Material and goods may contain sensors and/or actuators, for example to monitor or control that certain quality requirements are fulfilled, such as temperature or mechanical shock.

In a future "Networked society" scenario, there is expected to be a very large number of MTC devices in the wireless networks, as previously stated. Many of the MTC devices will transmit relatively small amounts of uplink data rather seldom, e.g. 100 bits once per hour. In LTE, there are plans of introducing a new solution for so-called "enhanced MTC coverage" with a target to enable MTC communication in areas where no communication is possible as of today. The target is formulated such as that the LTE link budget should be increased with approximately 20 dB, as compared to what is supported with the legacy LTE standard [3GPP Tdoc RP-121441]. Such a solution for enhanced MTC coverage is expected to make LTE even more attractive for MTC type of solutions, since it would imply that also MTC devices having very unfavorable radio conditions would be enabled to communicate in an LTE network. That is, devices which would not be able to communicate in an LTE network of today, herein called a "legacy" network, due e.g. to unfavorable radio conditions, could be able to communicate in an LTE network supporting enhanced MTC coverage. However, it is not yet clear how this improvement will be achieved. Further, it is not clear how MTC traffic and e.g. legacy data traffic should be coordinated in such a system.

SUMMARY

The herein described technology enables an efficient sharing of in-band radio resources between a legacy LTE system and a system for extended coverage, such as an implementation of enhanced MTC coverage described above. Access parameters of the system for extended coverage can be changed quickly by means of changing e.g. a synchronization signal transmitted by a base station and received by the extended coverage UEs. This method is useful for devices which support delay tolerant traffic and for which the extra overhead and complexity that this method exhibits are not prohibitive. It is an optimization method so as to allow devices with delay tolerant traffic to report their measurements in case the network is no longer congested e.g. by other high order priority users.

According to a first aspect, a method for updating system information is provided, to be performed by a network node operable in a wireless communication system. The method comprises transmitting system information, SI, to one or more UEs, said SI comprising multiple alternative sets, where each set assigns different values to one or multiple radio system parameters. The method further comprises determining which set, out of the multiple alternative sets, that should currently be applied for a UE, and further transmitting an SI selection signal to the UE, the SI selection signal indicating the determined set, thus enabling the UE to apply currently appropriate radio system parameters.

According to a second aspect, a method for updating system information is provided, to be performed by a UE operable in a wireless communication system. The method comprises receiving SI from a network node, said SI comprising multiple alternative sets, where each set assigns different values to one or multiple radio system parameters. The method further comprises receiving an SI selection signal from the network node, the SI selection signal indicating one of the alternative sets. The method further comprises applying the set indicated by the SI selection signal, thus enabling fast updating of system information in unfavorable radio conditions.

According to a third aspect, a network node is provided for updating system information. The network node is operable in a wireless communication system and comprises a transmitting unit adapted to transmit SI to one or more UEs, said SI comprising multiple alternative sets, where each set assigns different values to one or multiple radio system parameters. The network node further comprises a control unit adapted to determine which set, out of the multiple alternative sets, that should currently be applied for a UE. The network node is further adapted to transmit an SI selection signal to the UE, the SI selection signal indicating the determined set.

According to a fourth aspect, a UE for updating system information is provided. The UE is operable in a wireless communication system and comprises a receiving unit, adapted to receive SI from a network node, said SI comprising multiple alternative sets, where each set assigns different values to one or multiple radio system parameters. The receiving unit is further adapted to receive an SI selection signal from the network node, the SI selection signal indicating one of the alternative sets. The UE further comprises an applying unit, adapted to apply the set indicated by the SI selection signal.

BRIEF DESCRIPTION OF THE DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

Figure 1:
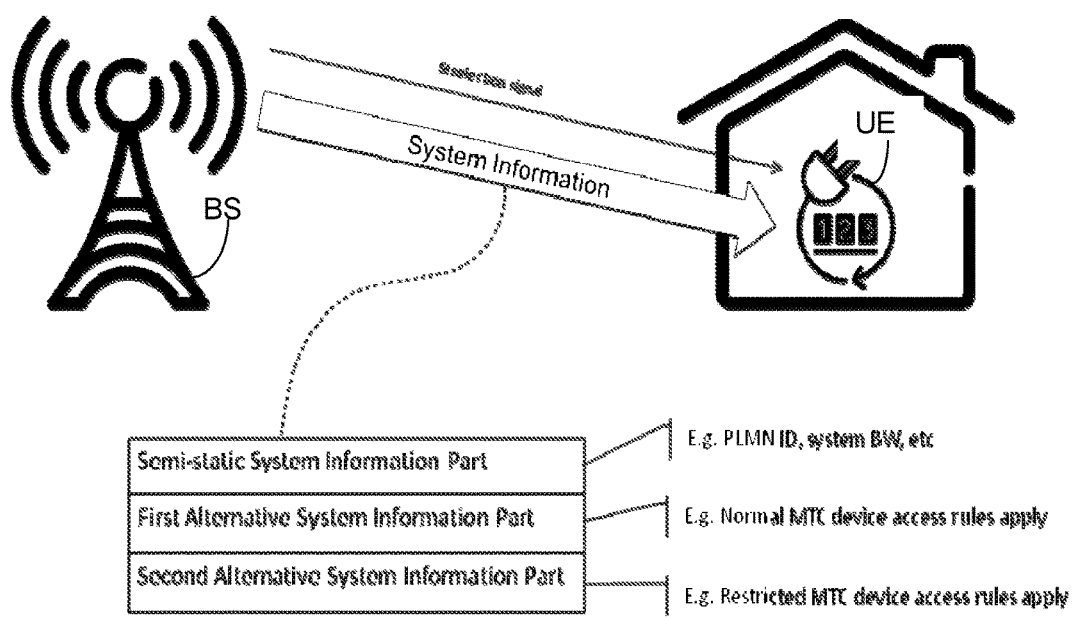
FIG. 1 shows signaling between a Base Station and a User Equipment in a wireless communication system, according to an exemplifying embodiment.

Herein, it is referred to an extended coverage and an extended coverage mode. By extended coverage is here meant an extension, such as the so-called "enhanced MTC coverage", discussed in the LTE community, which will also be further described below. The extended coverage may herein alternatively be denoted "deep coverage". A device operating in an enhanced coverage mode may herein be referred to e.g. as a "deep coverage UE", or a "deep coverage MTC-device". In analogy, a service utilizing the enhanced coverage may herein be denoted e.g. "deep coverage service". An MTC device is considered to be, and will be referred to, as a type of UE.

The solution described herein is primarily, but not exclusively, related to situations where a UE needs to communicate in an extended coverage mode. Communicating in an extended coverage mode is expected to consume more time and resources than communicating the same amount of information in a regular communication mode, at least if the extended coverage is achieved by use of repetition. In such a mode, it is expected that it will take a lot of time to receive e.g. system information. In excellent radio conditions, a UE will not need to use an extended coverage mode. The solution is herein described mainly in the context of MTC devices, since many MTC devices are expected to be located in places with unfavorable radio conditions, and are therefore expected to communicate in an extended coverage mode. However, there are examples where other UEs may benefit from communicating in an extended coverage mode. The solution may e.g. provide long range extended area coverage in wilderness areas.

In a system supporting extended coverage, there will be devices, e.g. MTC devices, which communicate in an extended coverage mode, but there may also be devices, e.g. smartphones or MTC devices, which do not support extended coverage, or which do not use extended coverage mode for the moment. These different devices should preferably be able to co-exist in the network and share the available resources. In such a scenario, it may be desired to control which devices that should be allowed to communicate at a certain time, and which devices that should not be allowed to communicate at that time. This may be achieved e.g. by updating certain parts of the system information (SI) of the devices. System information is information which enables a UE to access the network and to operate properly within the network and within a specific cell. System information is typically broadcasted repeatedly by a network. The system information includes, among other things, information about the downlink and uplink cell bandwidths, the uplink/downlink configuration in the case of TDD, detailed parameters related to random-access transmissions and uplink power control. The system information further comprises so-called "cell barring information", which is information regarding e.g. whether a cell may be accessed or not.

In case there is a temporary capacity problem in a cell it may be desired to change the cell barring information for some devices. For example, it may be desired to temporarily prevent devices that use a large number of resources for transmitting a small number of bits, e.g. due to repetition, from using the cell resources. However, it may also be desired to make exceptions from the prevention, e.g. for very important information, or for devices of subscribers paying a large amount of money for the delivery of their small number of bits. Therefore it may be desired to have a possibility to be selective when changing e.g. the cell barring information.

A coverage enhancement of 20 dB, as discussed for the "enhanced MTC coverage", is equivalent to achieving a 100 times higher signal-to-noise ratio. To achieve in the order of 20 dB coverage enhancements in LTE, multiple physical channels and physical signals will need to be improved. Since the required improvements are so large, and since LTE is already very good, i.e. there is no known flaw in LTE that can provide improvements anywhere near 100 times, it is likely that repetition will be used to provide most of the required coverage improvements. That is, the same information may need to be transmitted e.g. 100 times in order for a receiver to be able to decode the information correctly, due to that the received signal is so weak. Current LTE signals cannot easily be repeated approximately 100 times without consequences. Therefore, new signals may need to be defined for this purpose An outcome of the 3GPP work on enhanced coverage for MTC devices may therefore be a new set of signals and physical channels that are defined on top of the existing legacy LTE signals and physical channels. The new set of signals and channels may preferably be defined inside the data region of the current LTE carrier. That way, existing legacy UEs will simply ignore the new signals and channels, as they will appear to be data directed to some other UE, which is, in fact, the case, although the signaling format might be new.

Assigning a separate set of radio resources, e.g. a frequency band, to be dedicated for the deep coverage MTC terminals could become very costly. Therefore, it is desirable that legacy services and deep coverage services are enabled to co-exist on the same carrier. Deep-coverage UEs, such as deep coverage MTC devices, may consume a large amount of radio resources while generating very low income per device. During peak traffic hours those radio resources are better used for e.g. normal, legacy, voice and mobile broadband services, which generate better incomes, and therefore it may be beneficial to be able to temporarily bar, i.e. exclude, some of the deep coverage traffic at those times. But, since resources that are not needed by the legacy services at a given point in time are wasted today, it would not cost much to assign such resources to deep coverage services, as long as the resources can be efficiently shared with legacy services.

Below, the deep coverage devices will be referred to as MTC devices. As soon as the temporary capacity problem in a cell, as discussed above, is over, it will be desired to quickly inform the temporarily barred MTC devices that they are allowed back into the system again. However, changing the content of broadcasted system information (SI) normally takes a rather long time to perform. The system information can be updated only at specific radio frames or modification periods, as described in 3GPP TS 36.331 § 5.2.1.3. A sensible option for the SI modification period is that it should be at least higher than the maximum DRX cycle of devices in the cell. Upon consideration that DRX cycles in the orders of several minutes for MTC are currently under discussion, an idea on the required SI modification period can be obtained. Even under normal circumstances several paging intervals are required for such a process. For low-rate devices with extremely poor link performance that are operating in an extended coverage mode, such as a power meter in an indoor basement, the reception of the system information is also a problem. Receiving a large amount of updated system information through a very poor radio link might require an extensive amount of time consuming signal repetition. Thus, changing the system information to MTC devices may take an even longer time, in comparison to UEs operating in a normal mode. This is a problem which needs a solution.

In state-of-the-art systems it is not possible to change the system information fast enough. Cell barring information may be quite extensive, especially if it should be possible to differentiate the information such that different users have different cell barring parameters. At the same time, traffic fluctuations are happening at a millisecond time-scale. Therefore, there is a need for a new way of changing parts of the system information quickly and selectively. Herein, a solution to this problem is provided, which will be described in further detail below.

FIG. 1 shows an exemplifying embodiment of the solution. A base station transmits system information to an MTC device in need of coverage enhancement features, e.g. extensive repetition. The system information consists of an optional semi-static part and at least two alternative parts, a first and a second part in this example. That is, the system information, comprising different alternatives, is provided to the MTC device.

It should be noted that the base station may also transmit other system information to other users that are not shown in the figure. For example, the MTC system information shown in the figure may be completely separated from the "normal" or "regular" system information, which is not shown in the figure, directed to and received by legacy UEs, which are not in need of coverage enhancement features. Alternatively, a subset of the system information may coincide with the regular system information. However, even in this case—due to difficult coverage conditions for MTC devices—the signaling scheme for MTC devices may differ from legacy procedures.

In order for the MTC device to know which part of the optional system information to apply, the base station may also transmit an SI selection signal to the MTC device. The MTC device uses the SI selection signal to select which one of the alternative system information (SI) parts that currently applies. The MTC-device should at some point have been made aware of which part of the SI information that is indicated by a particular SI selection signal. Alternatively, the MTC-device could toggle between the alternatives, or change to a consecutive SI-part when detecting a change in SI selection signal.

In one embodiment this SI selection signal may be a synchronization signal that is anyway transmitted from the base station to enable the MTC devices to acquire time and frequency synchronization. Please note that this MTC synchronization signal may be separate from the normal legacy synchronization signals transmitted to normal, non-extended coverage mode, legacy UEs.

The SI selection signal may alternatively be some other signal than the synchronization signal, that is used also for other purposes, such as a demodulation reference signal that is anyway transmitted from the base station. It may also be a new signal designed explicitly for this purpose. The SI selection signal may be signaled in different ways. For example, it may be signaled as an information bit broadcasted over the whole coverage area or it may be sent only to a single user or a specific group of users. The SI selection signal may consist of one or more bits, and may be part of a protocol header, or, it may be transmitted e.g. as part of a so-called master information block (MIB).

In case the synchronization signal is used to communicate the SI selection signal, it will be needed to consider the relation between the synchronization sequence transmitted and the physical cell identity (PCI) of the base station. Normally, the PCI has a one-to-one mapping towards the synchronization signal waveform. Once a UE has detected the synchronization signal, which in LTE Rel-8 consists of a primary (PSS) and a secondary (SSS) synchronization signal, then it also knows the physical cell ID of the cell. The PCI is a locally unique identifier used to identify the cell in signaling and measurement protocols, e.g. during handover, but it is also used to derive a large number of cell specific signals, primarily uplink and downlink demodulation reference signals. If the synchronization signal waveform is to be used for indication of which system information part that currently applies, then it is important to clearly define how the MTC device should interpret a change of synchronization signal. One interpretation that should be avoided is that the MTC device thinks that the old cell is lost and that a new cell has entered. This could trigger an unnecessary attach procedure, where the MTC device tries to connect to the network via the cell corresponding to the newly found PCI. Instead, the MTC device should correctly understand that the new synchronization signal corresponds to the same cell as the old one. The MTC device may therefore keep its entire context in the base station, e.g. transmit and receive buffers, radio bearer configurations, cell-radio network temporary identifier (CRNTI), etc.

One way to implement this is to de-couple the PCI from the synchronization signal for the MTC devices that require extended coverage. This might be beneficial if it is desired to avoid the risk of having cells associated with several PCTs in case separate synchronization signals are defined for legacy UEs and extended coverage MTC devices. In order to enable an MTC device to use the correct PCI in signaling and measurement protocols, the PCI could be explicitly signaled as part of the system information targeting the extended coverage devices.

An alternative way is to design a several-to-one mapping between synchronization signals and the PCI. An MTC device may e.g. map the synchronization signal index to the PCI using a modulo operation which removes the ambiguity. In LTE the synchronization signal comprises two signals— the PSS (Primary Synchronization Signal), which has 3 different alternative realizations; and the SSS (Secondary Synchronization Signal), which has 168 different alternative realizations—and the cell ID is derived from their indices. Using such a multi-stage sync signal the cell could be determined by only one signal (e.g. SSS) and the SI selection signal could be the other signal, e.g. the PSS, which would enable selection of 1 out of 3 SI alternatives reusing current LTE numbers.

The mapping may also be based e.g. on a table look-up, which could be fixed e.g. in the specification, grouping two or more synchronization signals to a PCI. It should be noted that it is not mandatory that an equal number of synchronizations signals map to each PCI. The mapping table between synchronization signal index and PCI may also be explicitly signaled as part of the system information targeting MTC devices. It should also be noted that the number of synchronization signals may be increased compared to current LTE standard.

The existence of more than one synchronization signal/sequence might be hard coded at MTC devices, thus eliminating the risk of erroneous triggering of "lost cell", resulting in an unnecessary attach procedure, as indicated in the paragraph above.

Figure 2:
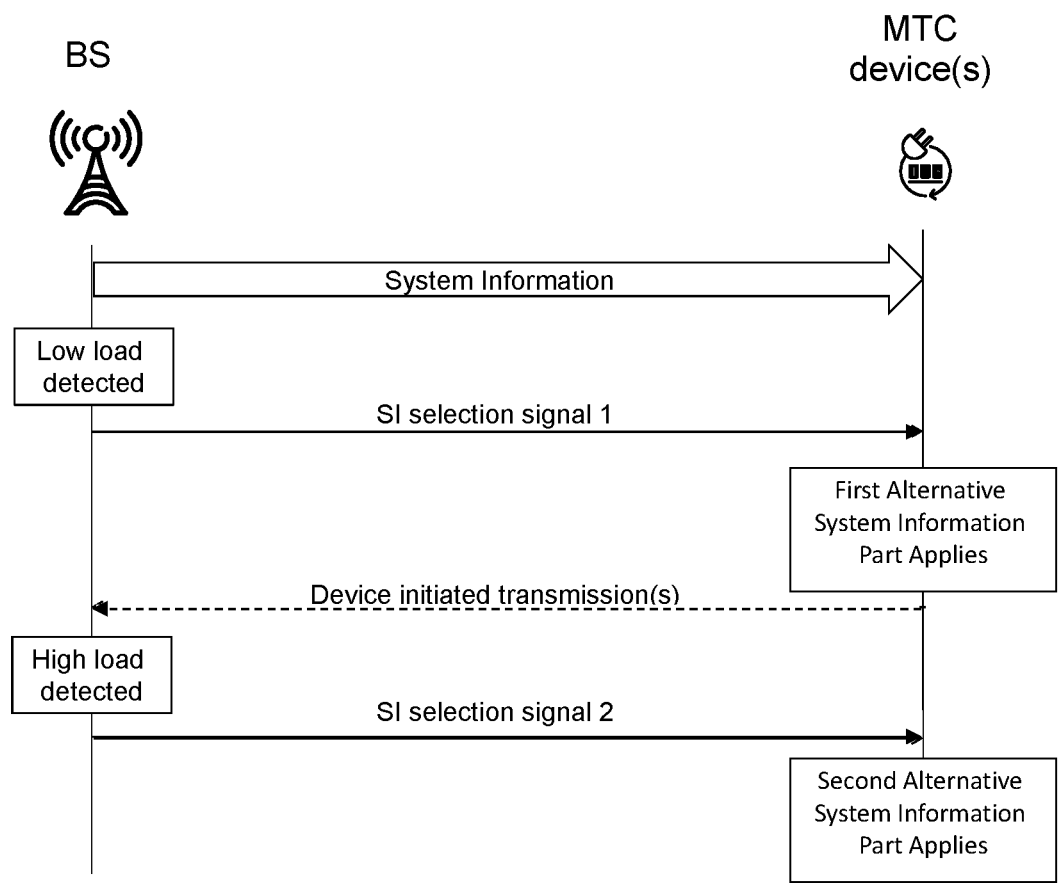
FIG. 2 illustrates an exemplifying signaling scheme according to an exemplifying embodiment.

FIG. 2 shows another example of the herein suggested technology. The base station "BS" transmits system information to many or all MTC devices in an extended coverage cell. At one time instant a low load is detected in the cell and hence there is no need to restrict some or all of the MTC devices from accessing the system. Therefore, as an example, the "SI selection signal 1" is transmitted. The MTC device detects this signal and understands, e.g. by consulting a mapping table, that the corresponding "first alternative system information part" applies. The MTC device may initiate one or more transmissions, illustrated as dashed line in FIG. 2, while this first system information part is valid or applied. At a later time instant, the base station detects a high load in the cell and it wants to restrict or prevent some of the MTC devices from accessing the network. It therefore sends out the "SI selection signal 2". The MTC device detects this signal and understands that the corresponding "second alternative system information part" now should be applied instead. In this example the MTC device is not allowed to initiate any transmissions when the second alternative system information part is valid or applied. The MTC device also understands that this signal is transmitted from the same network node as the old signal and that it (the MTC device) keeps its entire context in the network node.

The different alternative system information parts, e.g. first and second part as illustrated in FIG. 1, may also control the rate at which the MTC devices send their reports. In a normal situation, corresponding to e.g. the first alternative system information part, the MTC device may be allowed to access the network according to its default configuration, which may be e.g. once per 15 minutes. However, this rate may be reduced e.g. by a pre-defined fraction, when an overload situation occurs. For example, the MTC device may instead be allowed to access the network once every 30 minutes or once every hour during the overload situation. This new, reduced, configuration may be signaled or indicated to the MTC device e.g. by the transmission of "SI selection signal 2", as illustrated in FIG. 2. When applying a reduced access rate or frequency, the network can inform MTC devices e.g. to skip some of their upcoming measurement reports altogether, or to postpone them so that they can be combined into less frequent transmissions containing several measurement reports each.

Whether to skip or to postpone individual measurement reports can e.g. be configurable by RRC signaling or indicated through the choice of synchronization signal. The latter case may require that additional synchronization signals are defined. It could be determined in advance or on the fly based on different factors, e.g. the priority of the data or on UE subscription information. For example, when the access restrictions apply, it may be desired to allow certain types of information without delay, e.g. different kinds of alarms, while other information, e.g. electricity meter readings, can either be skipped altogether or reported with reduced periodicity, where the reports with reduced periodicity could possibly, as already mentioned, contain measurement reports from more than one measurement occasion.

The system information can either be transmitted via broadcast or dedicated transmission. Transmission via broadcast has the merit of reduced overhead when the system is fully loaded, while dedicated signaling has the merit of allowing for more flexible configurations, e.g. as when some important MTC devices should be allowed to transmit despite high load. Such important MTC devices could e.g. be configured with multiple identical alternative SI alternatives or just a single one, which must then always be used, independent of the SI selection signal. Thereby, such MTC devices could have e.g. a high access rate even when using broadcast of different SI selection signals. Further, this on/off grouping dedicated signaling allows a more fine granular approach, e.g. that some MTC devices are not allowed to transmit at all during high loads, some MTC devices are allowed to transmit with reduced periodicity during high loads, and some MTC devices are not impacted at all. To avoid the high overhead associated with dedicated signaling the "baseline", where "baseline" here refers to that it is valid for many or most MTCs, system information configuration, including the baseline alternative sets, may be broadcasted, and "deviating", referring to "valid for few" or "exceptions to the baseline version", MTC behavior may be signaled to concerned MTC devices via dedicated signaling.

The new SI and SI Selection Signals, according to embodiments of the herein presented solution, directed to MTC devices, can be transmitted in the same time and frequency resources as used for the current, legacy, SI and SIBs, and they can be separated e.g. by using different codes for the different signals.

The herein described method and messages may be applied for MTC devices whose traffic can tolerate delay. Information on the traffic type supported by different MTC devices can be provided to the network according to the prior art. The method and signaling structure described herein may be supported e.g. by devices which can handle the extra energy consumption which may be needed for reading the extra SI related messages and for using more than one synchronization sequences.

As previously mentioned, even though the solution herein is primarily described for MTC devices, other types of UEs could also use and benefit from the solution. For example, in very large cells, where a UE, such as a smartphone, could have problems with initial access due to that the UE signals do not reach the base station, the UE could use an extended coverage procedure for accessing the cell. When having accessed the cell, and e.g. when more data needs to be transmitted in the uplink, beamforming could be used to enable regular communication between the UE and the base station.

In a general manner, the herein suggested solution could be described as a first radio communication node transmitting system information, SI, to a second radio communication node, where the system information contains multiple, alternative, sets, where each set assigns different values to one or multiple radio system parameters. For example, the one or multiple radio system parameters could be access related parameters such as cell barring information, while other states and parameters remains unaffected when applying a different SI set. Such other states and parameters could be related to e.g. UE context, CRNTI, system bandwidth etc. Embodiments of the herein suggested solution may further comprise that a radio communication node (the first transmitting node, or another) transmits a signal, which may be denoted an "SI selection signal", indicating the set currently applicable in the radio communication system. The second radio communication node may receive the SI, including the multiple alternative sets, and may then receive the signal indicating the currently applicable set. Based on the received signal, the second radio communication node may determine which set to apply. The first radio communication node may be a base station such as an eNB, and the second radio communication node may be a UE, such as an MTC-device, e.g. located in a basement in a building. The SI selection signal may be a synchronization signal, which may be dedicated to MTC devices, or be a signal which is directed both to legacy UEs and to UEs operating in an extended coverage mode The SI is assumed to be transmitted, or otherwise provided, to devices very seldom, or at least be received by the MTC devices very seldom, e.g. once at setup and then possibly when the whole or parts of the SI information need to be replaced due to some major change.

Figure 3A:
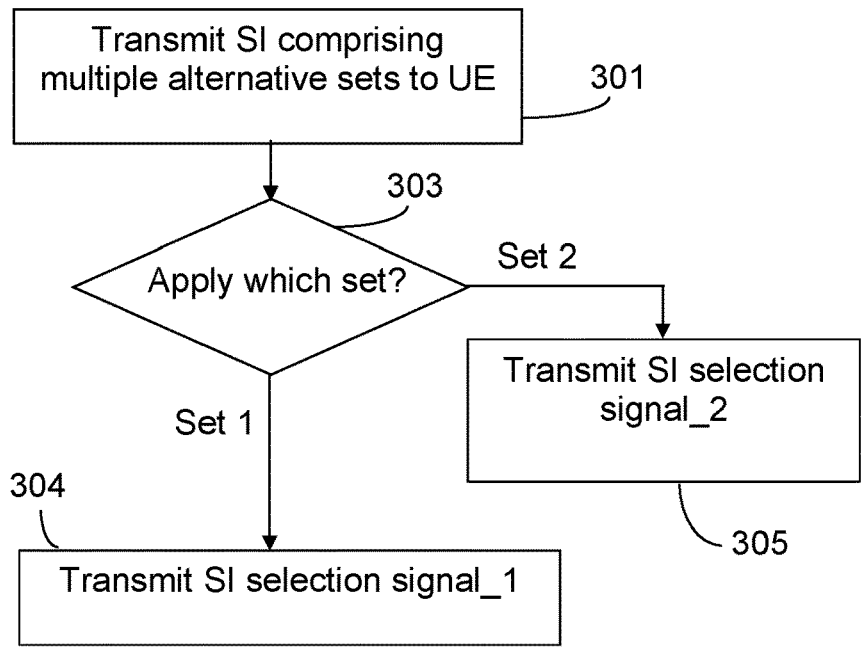
FIG. 3a is a flow chart illustrating procedure in a BS, according to an exemplifying embodiment.
Figure 3B:
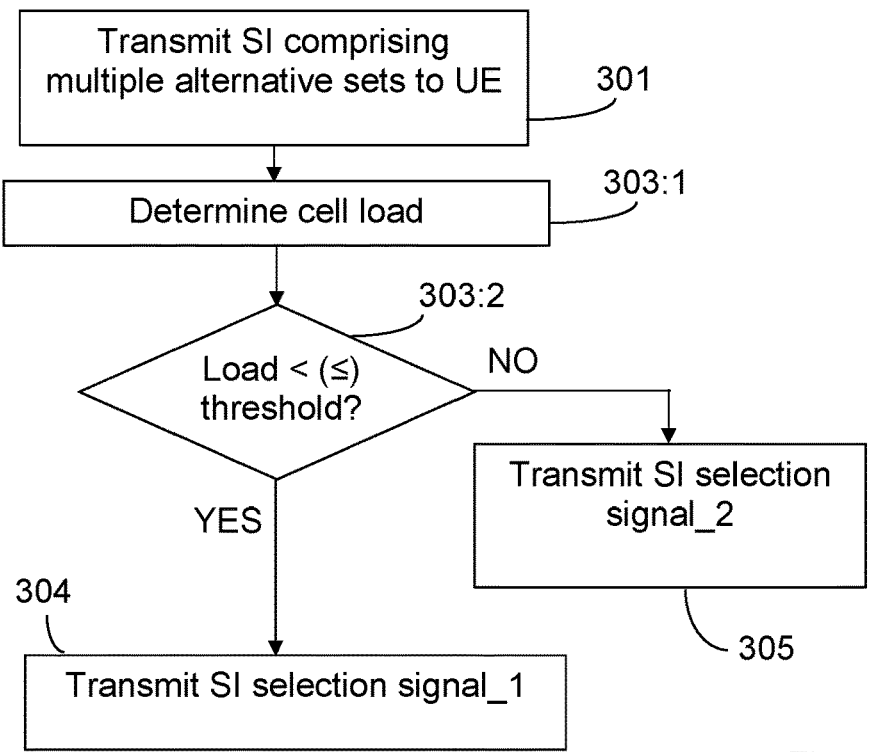
FIG. 3b is another flow chart illustrating a procedure in a BS, according to another exemplifying embodiment.

An exemplifying procedure in a network node, such as an eNB in an LTE network, is illustrated in FIG. 3a. The network node is operable to support an extended coverage mode, such as an implementation of "enhanced MTC coverage", as described above. The network node transmits SI to one or more UEs in an action 301. The UEs also support the extended coverage mode. The SI comprises at least one part for which a number of alternatives are provided. That is, the SI comprises multiple alternative sets, where each set assigns different values to one or multiple radio system parameters. The network node then determines 303 which set, out of the multiple alternative sets, that should currently be applied for a UE. This action could, for example, be implemented by the two actions 303:1 and 303:2, as illustrated in FIG. 3b, which will be further described below.

The network node then transmits an SI selection signal to the UE, where the SI selection signal indicates the determined set, in accordance with the determining in the action 303. Thereby, the UE is enabled to apply currently appropriate radio system parameters, i.e. the parameters in the determined system information set.

The UEs could be MTC devices, such as power meters or alarm sensors, but could alternatively be e.g. smartphones, tablets, computers or other devices. The UEs could be experiencing unfavorable radio conditions, and be in need of features associated with the extended coverage mode, such as e.g. extensive repetition. The SI could be broadcasted or transmitted in a dedicated manner, as previously described. The part or parts of the SI for which alternative sets are provided may be related to different things, which will be further described below.

The determining of which set, out of the multiple alternative sets, that should currently be applied for a UE could be performed in different ways. For example, the network node could determine the current load in a cell associated with the network node. The determined cell load could be compared with a threshold value, representing a boundary e.g. between a load defined as high load, and a load defined as normal load. Depending on the comparison, it could be determined whether the current load is e.g. "high" or "normal", and a set, out of the plurality of alternative sets, corresponding to the determined current conditions could be determined or identified, and be indicated to a concerned UE via the associated SI selection signal. The SI selection signal could be implemented or realized in different ways, as previously described.

For example, at one point in time, the load may be determined by the network node to be "high". The network node then selects alternative SI set_2, which is to be used by a certain type of UE during high load. "Certain type of UE" could refer e.g. to a low priority MTC device. The SI selection signal associated with, and indicating, alternative SI set_2 is then transmitted to a UE, which is of the certain type. At a later point in time, the load in the cell may have changed, and be determined to be "normal". Then, at normal load, there may be another set out of the alternative sets that should be applied for UEs of the certain type, e.g. alternative SI set_1. Then, the SI selection signal associated with, and indicating, alternative SI set_1 may be transmitted to the UE. The transmitting of different SI selection signals based on the determined load in the cell is illustrated as actions 304 and 305 in FIG. 3b. There may be more than two alternative SI selection signals and alternative SI sets. The decision criterion may also be different than the example given in FIG. 3b.

The one or multiple radio system parameters may be related to cell access. That is, the system parameter comprised in the alternative sets may control e.g. whether the UE is allowed to access a cell or not, or to which extent the UE is allowed to access the cell. For example, the one or multiple radio system parameters may be related to so-called cell barring.

The SI selection signal may be a synchronization signal. By synchronization signal is meant a reference signal or sequence which is used by UEs for synchronization. It could be a synchronization signal which is used for synchronization by legacy UEs and/or by UEs, such as MTC devices, which are in need of an extended coverage mode. Alternatively, one or more dedicated signals could be used as SI selection signals.

Figure 4:
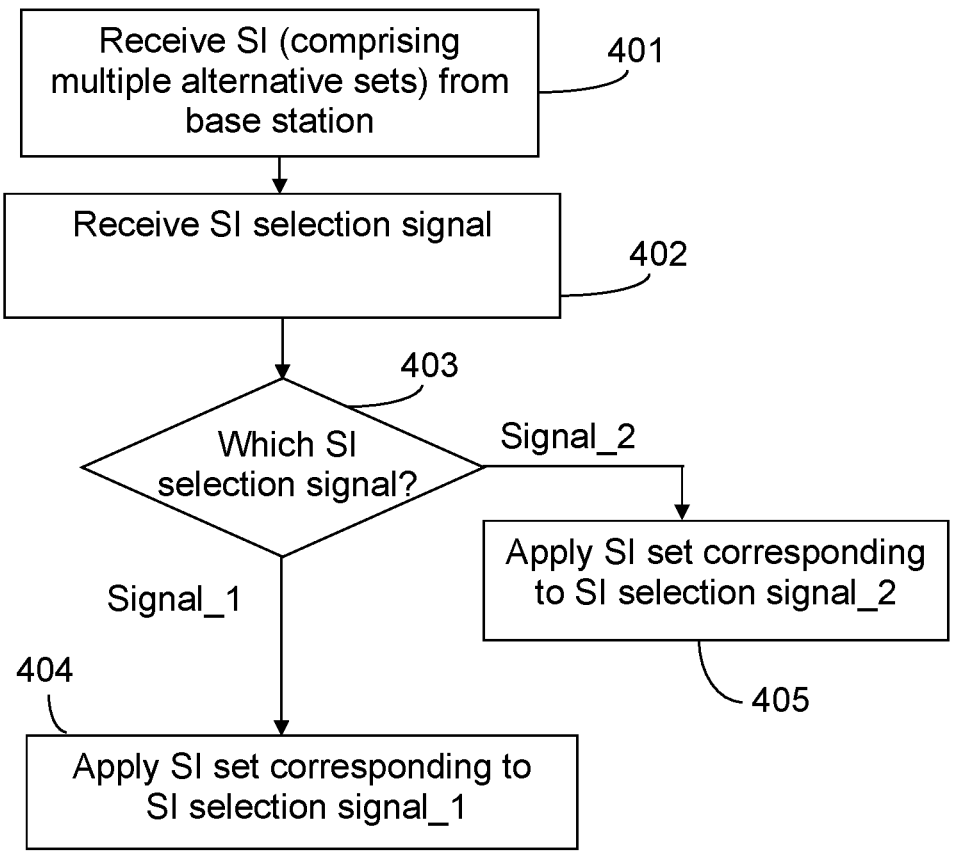
FIG. 4 is a flow chart illustrating procedure in a UE, according to an exemplifying embodiment.

A procedure for updating system information, performed by a UE is illustrated in FIG. 4. The UE may be e.g. an MTC device or a smartphone, which supports and is operable in an extended coverage mode, such as an implementation of so-called "enhanced MTC coverage". System Information, SI, is received 401 from a network node. The SI comprises multiple alternative sets, where each set assigns different values to one or multiple radio system parameters. Further, an SI selection signal is received 402 from the network node. The SI selection signal indicates one of the alternative sets. Then, the UE applies 404, 405 the set, out of the multiple alternative sets, which corresponds to the SI selection signal. Thereby, fast updating of system information is enabled, also in unfavorable radio conditions.

The SI, may be received from a base station over an air interface. Alternatively, the SI and the associated alternative parts thereof may be provided to the UE in some other way, e.g. during installation using e.g. a portable storage device, such as a USB memory. The received SI may be stored in the UE, e.g. in a memory.

The receiving of the SI may take a long time, e.g. when the UE is located in unfavorable radio conditions. For example, if the extended coverage mode relies on repetition, the SI may need to be received e.g. 100 times for the UE to be able to decode it correctly. The SI selection signal may also need to be received a large number of times for the same reasons, but since the SI selection signal only comprises a fraction of the amount of data as compared to the SI information, the time is takes to receive the SI selection signal is small in comparison.

The applying of the set indicated by the SI selection signal may comprise determining which alternative SI set that is indicated by the received SI selection signal. This determining may comprise use of a mapping table or other interpretation scheme stored in, or at least accessible to, the UE. The mapping table could be provided to the UE e.g. as part of the received SI or in some other therefore suitable way. At a later time instant, the UE may receive a second SI selection signal, indicating that another one of the alternative SI sets of the received SI should be used, instead of the one determined/selected based on the received first SI selection signal. The UE may then determine, based on the second SI selection signal, which alternative SI set that should be applied. This applying of different SI sets based on the SI selection signal is illustrated as actions 404 and 405 in FIG. 4. It should be noted that there may be more than two alternative SI selection signals and sets.

As described above, the one or multiple radio system parameters may be related to cell access, such as cell barring.

The SI selection signal, which may be e.g. a synchronization signal, has been described above, and will therefore not be described in more detail here.

Embodiments described herein also relate to a network node operable in a wireless communication system. The network node is adapted to perform at least one embodiment of the method described above. The network node is associated with the same technical features, objects and advantages as the method described above. The network node will be described in brief in order to avoid unnecessary repetition.

Below, an exemplifying network node, 501, adapted to enable the performance of the above described procedure in a network node, will be described with reference to FIG. 5. The network node supports an extended coverage mode such as an implementation of the enhanced MTC coverage mode described above.

The part of the network node which is most affected by the adaptation to the herein described method is illustrated as an arrangement 501, surrounded by a dashed line. The network node could be a base station such as an eNB in an LTE communication system. The network node 500 and arrangement 501 is further illustrated as to communicate with other entities via a communication unit 502 which may be regarded as part of the arrangement 501. The communication unit comprises means for communication, such as e.g. a receiver 509 and a transmitter 508, or a transceiver. The communication unit may alternatively be denoted "interface". The arrangement or network node may further comprise other functional units 507, such as e.g. functional units providing regular eNB functions, and may further comprise one or more storage units 506.

The arrangement 501 could be implemented e.g. by one or more of: a processor or a micro processor and adequate software and memory for storing thereof, a Programmable Logic Device (PLD) or other electronic component(s) or processing circuitry configured to perform the actions described above, e.g. in any of the FIGS. 3a-3b.

The arrangement part of the network node may be implemented and/or described as follows:

The network node comprises a transmitting unit 503, adapted to transmit system information, SI, to one or more UEs, said SI comprising multiple alternative sets, where each set assigns different values to one or multiple radio system parameters. The network node further comprises a control unit, 504, adapted to determine which set, out of the multiple alternative sets, that should currently be applied for a UE. The control unit, or some other unit in the arrangement, is further adapted to transmit an SI selection signal to the UE, the SI selection signal indicating the determined set. The term "transmit" also covers triggering transmission of the SI selection signal.

As described above, the one or multiple radio system parameters may be related to cell access, e.g. to cell barring. Further, the SI selection signal may be a synchronization signal, as previously described.

Embodiments described herein also relate to a UE operable in a wireless communication system. The UE is adapted to perform at least one embodiment of the method described above. The UE is associated with the same technical features, objects and advantages as the method, performed by a UE, described above. The network node will be described in brief in order to avoid unnecessary repetition.

Below, an exemplifying UE 601, adapted to enable the performance of the above described procedure performed by a UE will be described with reference to FIG. 6. The UE 600 is operable in a wireless communication system. The UE supports an extended coverage mode, such as an implementation of the enhanced MTC coverage mode described above.

The part of the UE which is most affected by the adaptation to the herein described method is illustrated as an arrangement 601, surrounded by a dashed line. The network node could be a UE such as an MTC device or a smartphone in an LTE communication system. The UE 600 and arrangement 601 is further illustrated as to communicate with other entities via a communication unit 602 which may be regarded as part of the arrangement 601. The communication unit comprises means for communication, such as e.g. a receiver 609 and a transmitter 608, or a transceiver. The communication unit may alternatively be denoted "interface". The arrangement or UE may further comprise other functional units 607, such as e.g. functional units providing regular UE functions, and may further comprise one or more storage units 606.

The arrangement 601 could be implemented e.g. by one or more of: a processor or a micro processor and adequate software and memory for storing thereof, a Programmable Logic Device (PLD) or other electronic component(s) or processing circuitry configured to perform the actions described above, e.g. in FIG. 4.

The arrangement part of the UE may be implemented and/or described as follows:

The UE comprises a receiver unit 603, adapted to receive system information, SI, from a network node, said SI comprising multiple alternative sets, where each set assigns different values to one or multiple radio system parameters, and further adapted to receive an SI selection signal from the network node, the SI selection signal indicating one of the alternative sets. The UE further comprises an applying unit 605, adapted to apply the set indicated by the SI selection signal.

As described above, the one or multiple radio system parameters may be related to cell access, e.g. to cell barring. Further, the SI selection signal may be e.g. a synchronization signal, as previously described.

The UE may further comprise a determining unit 604, which could alternatively be denoted "selecting unit" and/or "identifying unit". The determining unit may be adapted to determine which SI selection signal that has been received, and which set, of the multiple alternative sets of SI, that should be applied, based on the received SI selection signal. The determining could be based on different things, such as a mapping table or other decision scheme, stored in the UE, as previously described. Alternatively, the applying unit could be adapted to perform this step.

Figure 5:
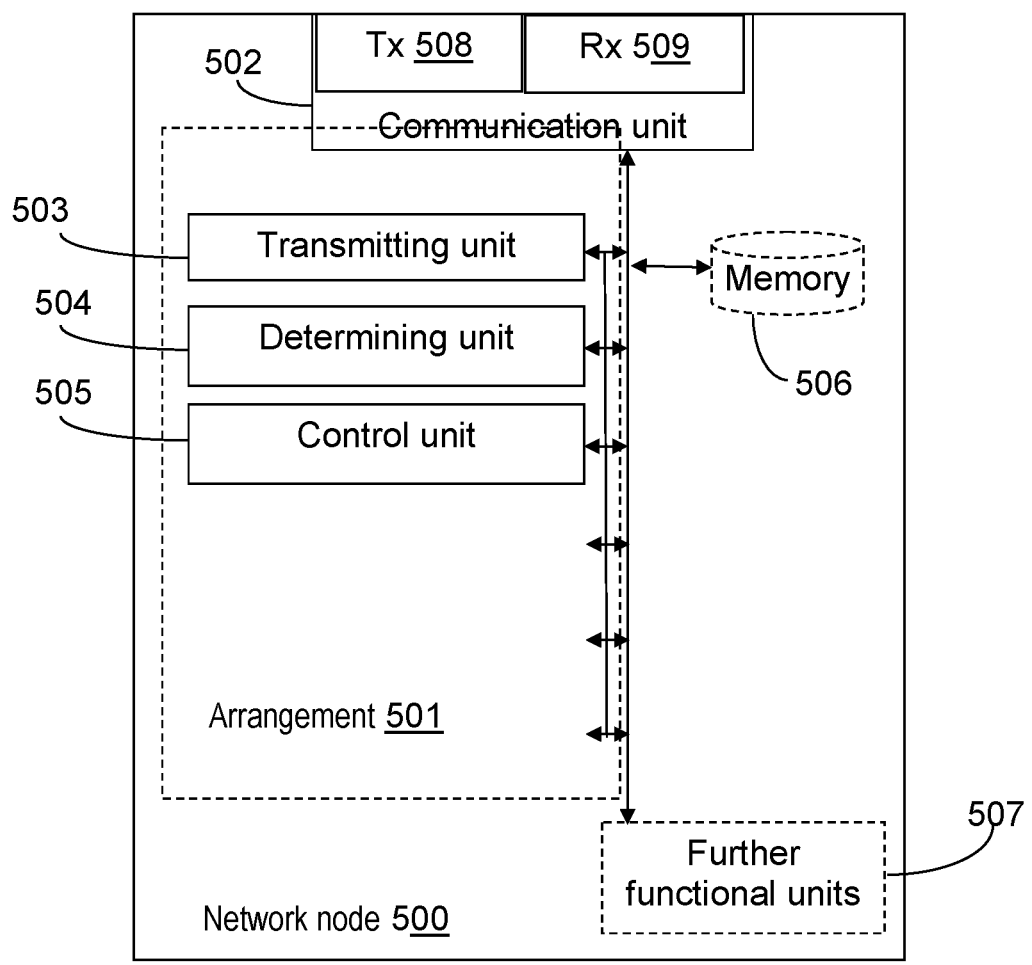
FIG. 5 is a block chart, illustrating a BS, according to an exemplifying embodiment.
Figure 6:
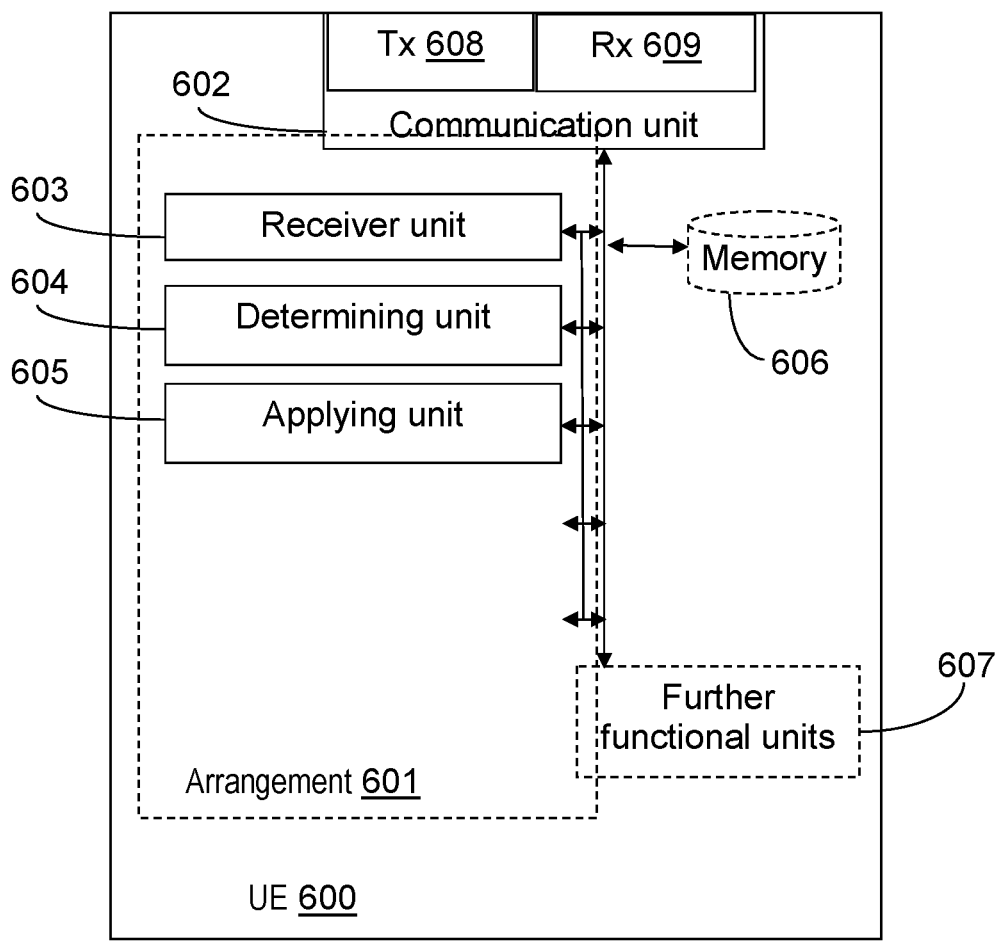
FIG. 6 is a block chart, illustrating a UE, according to an exemplifying embodiment.
Figure 7:
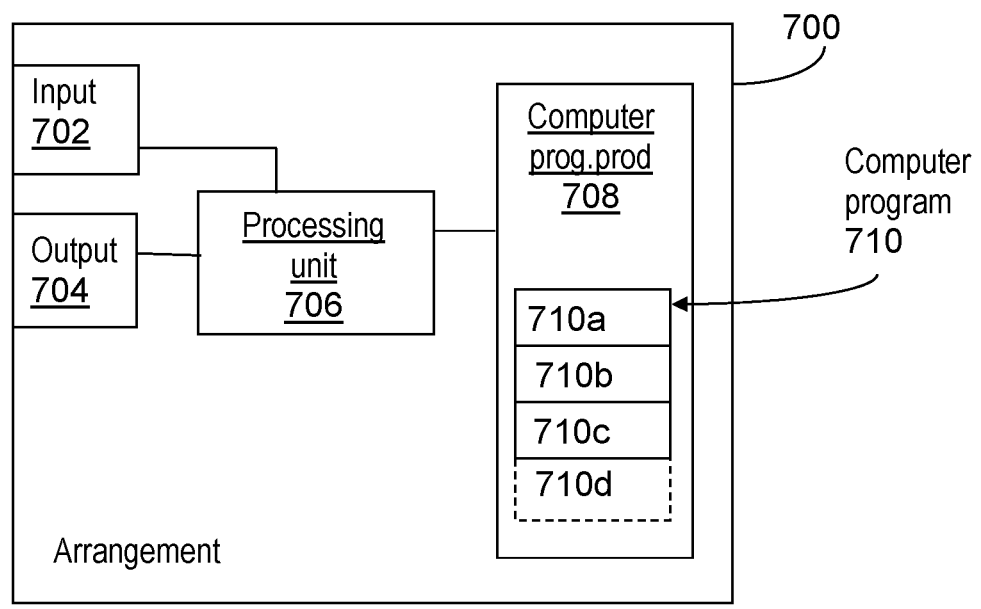
FIG. 7 is a block chart illustrating an arrangement according to an exemplifying embodiment.

FIG. 7 schematically shows a possible embodiment of an arrangement 700, which also can be an alternative way of disclosing an embodiment of the arrangement 501 or 601 illustrated in any of FIG. 5 or 6. Comprised in the arrangement 700 are here a processing unit 706, e.g. with a DSP (Digital Signal Processor). The processing unit 706 may be a single unit or a plurality of units to perform different actions of procedures described herein. The arrangement 700 may also comprise an input unit 702 for receiving signals from other entities, and an output unit 704 for providing signal(s) to other entities. The input unit 702 and the output unit 704 may be arranged as an integrated entity.

Furthermore, the arrangement 700 may comprise at least one computer program product 708 in the form of a non-volatile or volatile memory, e.g. an EEPROM (Electrically Erasable Programmable Read-Only Memory), a flash memory and/or a hard drive. The computer program product 708 may comprise a computer program 710, which comprises code means, which when executed in the processing unit 706 in the arrangement 700 causes the arrangement and/or a node in which the arrangement is comprised to perform the actions e.g. of the procedures described earlier in conjunction with FIG. 3*a*, 3*b* or 4.

The computer program 710 may be configured as a computer program code structured in computer program modules. Hence, in an exemplifying embodiment for use in a network node, the code means in the computer program 710 of the arrangement 700 comprises a transmitter module 710*a* for transmitting System Information. The computer program 710 may further comprise a determining module 710*b*, for determining a cell load. The computer program 710 further comprises a selecting module 710*c*, for selecting or determining which set out of multiple sets related to the SI, to apply, e.g. based on the cell load, and thereby determining, which SI selection signal to transmit to a UE. The computer program may further comprise additional computer program modules 710*d*, adapted to provide some or all of the different actions of the embodiments described above in conjunction with the procedure in a network node.

A corresponding arrangement in a UE could be described in a similar manner, with the necessary changes made, which changes may be derived from other parts of this document.

The modules 710*a-c* could essentially perform the actions of the flow illustrated in FIG. 3*a* or 3*b*, to emulate the arrangement 501 illustrated in FIG. 5.

Although the code means in the embodiment disclosed above in conjunction with FIG. 7 are implemented as computer program modules which when executed in the processing unit causes the decoder to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node or within the UE.

The above description of various embodiments of the herein suggested technology, while not limited to use in LTE systems, may be read and understood in the context of the existing 3GPP standards and revisions thereto, and may be understood to reflect adaptations of well-known physical structures and devices to carry out the described techniques.

Examples of several embodiments of the herein suggested technology have been described in detail above. Those skilled in the art will appreciate that the herein suggested technology can be implemented in other ways than those specifically set forth herein, without departing from essential characteristics of the suggested technology.

The solution suggested by the inventors is herein mostly described in terms of EPS/LTE. It should, however, be noted that the general concepts of the solution are applicable also at least to UMTS/WCDMA/HSPA, and other systems having an extended coverage mode to support e.g. MTC devices in unfavorable radio conditions.

It is to be understood that the choice of interacting units or modules, as well as the naming of the units are only for exemplifying purpose, and nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities.

ABBREVIATIONS

3GPP 3$^{rd}$ Generation Partnership Project
BS Base Station, e.g. eNB
C-RNTI Cell Radio Network Temporary Identifier
eNB,
eNodeB evolved (E-UTRAN) NodeB
EPS Evolved Packet System
E-UTRAN Evolved UTRAN
HSPA High Speed Packet Access
LTE Long Term Evolution MTC Machine Type Communication
RRC Radio Resource Control
UE User Equipment
UMTS Universal Mobile Telecommunications System
UTRAN Universal Terrestrial Radio Access Network

The invention claimed is:

1. A method for updating system information, performed by a network node in a wireless communication system, the method comprising:
   transmitting multiple alternative sets of system information, SI, from the network node to one or more User Equipments, UEs, the multiple alternative sets comprising different respective values for at least one radio system parameter included in the multiple alternative sets, wherein the at least one radio system parameter is for cell barring;
   determining to bar system access by a first group of UEs while permitting system access by a second group of UEs;
   determining a set, among the multiple alternative sets, to be applied by the first group of UEs to bar access by the first group of UEs; and
   transmitting an SI selection signal from the network node to the UE, the SI selection signal indicating the determined set to be applied by the UE.

2. The method of claim 1, wherein the UE is a Machine Type Communication, MTC, device.

3. The method of claim 1, further comprising:
   detecting a high load in a cell, and determining to bar system access by the first group of UEs in response to detection of the high load; and
   thereafter detecting a low load in the cell and determining to allow system access by the first group of UEs in response to detection of the low load.

4. The method of claim 1, wherein the first group of UEs is a group of deep coverage UEs and the second group is a group of legacy UEs.

5. The method of claim 4, wherein the deep coverage UEs receive enhanced coverage by repetitive transmission from the network node.

6. The method of claim 4, wherein the deep coverage UEs receive control information within a data region of an existing Long Term Evolution (LTE) carrier.

7. The method of claim 1, wherein determining the set comprises determining that a first alternative set among the multiple alternative sets should be applied by the UE, and wherein transmitting the SI selection signal comprises transmitting a first synchronization signal from the network node to the UE responsive to determining that the first alternative set should be applied by the UE, and wherein the first synchronization signal indicates that the first alternative set should be applied by the UE thus enabling the UE to apply the radio system parameter with a first value included in the first alternative set, the method further comprising:
   after transmitting the first synchronization signal, determining that a second alternative set among the multiple alternative sets should be applied by the UE; and
   responsive to determining the second alternative set should be applied by the UE, transmitting a second synchronization signal from the network node to the UE wherein the second synchronization signal indicates that the second alternative set should be applied by the UE thus enabling the UE to apply the radio system parameter with a second value included in the second alternative set, and wherein the first and second synchronization signals are different.

8. The method of claim 7 wherein the first alternative set defines the first value for the radio system parameter for cell barring, the second alternative set defines the second value for the radio system parameter for cell barring, and the first and second values for the radio system parameter for cell barring are different.

9. The method of claim 7 wherein the first synchronization signal includes a first Primary Synchronization Signal (PSS) and a Secondary Synchronization Signal (SSS), wherein the second synchronization signal includes a second PSS and the SSS, wherein the first and second Primary Synchronization Signals are different, and wherein the first and second synchronization signals correspond to a same cell of the network node.

10. A method for updating system information, performed by a User equipment, UE, in a wireless communication system, the method comprising:
    receiving multiple alternative sets of system information, SI, from a network node, the multiple alternative sets comprising different respective values for at least one radio system parameter included in the multiple alternative sets, wherein the at least one radio system parameter is for cell access by the UE or for cell barring;
    receiving an SI selection signal from the network node, the SI selection signal indicating one of the alternative sets and being adapted to selectively bar system access by a first group of UEs while permitting system access by a second group of UEs; and
    responsive to receiving the SI selection signal, applying the set indicated by the SI selection signal to bar system access by the UE.

11. The method of claim 10, wherein the UE is a Machine Type Communication, MTC, device.

12. The method of claim 10, wherein receiving the SI selection comprises receiving a first synchronization signal from the network node at the UE, and wherein the first synchronization signal indicates that a first alternative set among the multiple alternative sets should be applied by the UE, the method further comprising:
    responsive to receiving the first synchronization signal, applying the radio system parameter with a first value included in the first alternative set for operation of the UE;
    after receiving the first synchronization signal, receiving a second synchronization signal from the network node at the UE, wherein the second synchronization signal indicates that a second alternative set among the multiple alternative sets should be applied by the UE, and wherein the first and second synchronization signals are different; and
    responsive to receiving the second synchronization signal, applying the radio system parameter with a second value included in the second alternative set for operation of the UE.

13. The method of claim 12 wherein the first alternative set defines the first value for the radio system parameter for cell barring, the second alternative set defines the second value for the radio system parameter for cell barring, and the first and second values for the radio system parameter for cell barring are different.

14. The method of claim 12, wherein the first synchronization signal includes a first Primary Synchronization Signal (PSS) and a Secondary Synchronization Signal (SSS), wherein the second synchronization signal includes a second Primary Synchronization Signal and the Secondary Synchronization Signal, wherein the first and second Primary Synchronization Signals are different, and wherein the first and second synchronization signals correspond to a same cell of the network node.

15. A network node for updating system information, being used in a wireless communication system, the network node comprising:
   a transmitter, adapted to transmit multiple alternative sets of system information, SI, from the network node to one or more User Equipments, UEs, the multiple alternative sets comprising different respective values for at least one radio system parameter included in the multiple alternative sets, wherein the at least one radio system parameter is for cell access by the UE or for cell barring; and
   at least one controller, adapted to determine to bar system access by a first group of UEs while permitting system access by a second group of UEs, and further adapted to determine a set, among the multiple alternative sets, to be applied by the first group of UEs to bar access by the first group of UEs, and further adapted to transmit an SI selection signal from the network node to the UE, the SI selection signal indicating the determined set to be applied by the UE.

16. The network node of claim 15, wherein the controller is adapted to determine that a first alternative set among the multiple alternative sets should be applied by the UE, and to transmit a first synchronization signal from the network node to the UE responsive to determining that the first alternative set should be applied by the UE, wherein the first synchronization signal indicates that the first alternative set should be applied by the UE thus enabling the UE to apply the radio system parameter with a first value included in the first alternative set, and
   wherein the controller is adapted to determine that a second alternative set among the multiple alternative sets should be applied by the UE after transmitting the first synchronization signal responsive to determining that the second alternative set should be applied by the UE wherein the first and second alternative sets of the SI are different, and to transmit a second synchronization signal from the network node to the UE wherein the second synchronization signal indicates that the second alternative set of the SI should be applied by the UE thus enabling the UE to apply the radio system parameter with a second value included in the second alternative set, and wherein the first and second synchronization signals are different.

17. The network node of claim 16 wherein the first alternative set of the SI defines the first value for the radio system parameter for cell barring, wherein the second alternative set of the SI defines the second value for the radio system parameter for cell barring, and wherein the first and second values for the radio system parameter for cell barring are different.

18. The network node of claim 16 wherein the first synchronization signal includes a first Primary Synchronization Signal (PSS) and a Secondary Synchronization Signal (SSS), wherein the second synchronization signal includes a second PSS and the SSS, and wherein the first and second Primary Synchronization Signals are different, and wherein the first and second synchronization signals correspond to a same cell of the network node.

19. A User Equipment, UE, configured to update system information, being operable in a wireless communication system, the UE comprising:
   a receiver, adapted to receive multiple alternative sets of system information, SI, from a network node, the multiple alternative sets comprising different respective values for at least one radio system parameter included in the multiple alternative sets, wherein the at least one radio system parameter is for cell access by the UE or for cell barring, and further adapted to receive a SI selection signal adapted to selectively bar system access by a first group of UEs while permitting system access by a second group of UEs; and
   electronic circuitry adapted to apply the set indicated by the SI selection signal responsive to receiving the SI selection signal to bar system access by the UE.

20. The UE of claim 19, wherein the receiver is adapted to receive the SI selection by receiving a first synchronization signal from the network node at the UE, wherein the first synchronization signal indicates that a first alternative set among the multiple alternative sets should be applied by the UE,
   wherein the electronic circuitry is adapted to apply the radio system parameter having a first value included in the first alternative set for operation of the UE responsive to receiving the first synchronization signal,
   wherein the receiver is adapted to receive a second synchronization signal from the network node at the UE after receiving the first synchronization signal, wherein the second synchronization signal indicates that a second alternative set among the multiple alternative sets should be applied by the UE, and wherein the first and second synchronization signals are different, and
   wherein the electronic circuitry is adapted to apply the radio system parameter having a second value included in the second alternative set for operation of the UE responsive to receiving the second synchronization signal.

21. The UE of claim 20, wherein the first alternative set defines the first value for the radio system parameter for cell barring, the second alternative set defines the second value for the radio system parameter for cell barring, and the first and second values for the radio system parameter for cell barring are different.

22. The UE of claim 19, wherein the first synchronization signal includes a first Primary Synchronization Signal (PSS) and a Secondary Synchronization Signal (SSS), wherein the second synchronization signal includes a second Primary Synchronization Signal and the Secondary Synchronization Signal, wherein the first and second Primary Synchronization Signals are different, and wherein the first and second synchronization signals correspond to a same cell of the network node.

* * * * *

UNITED STATES PATENT AND TRADEMARK OFFICE
CERTIFICATE OF CORRECTION

PATENT NO. : 10,064,086 B2
APPLICATION NO. : 15/376852
DATED : August 28, 2018
INVENTOR(S) : Frenger et al.

Page 1 of 1

It is certified that error appears in the above-identified patent and that said Letters Patent is hereby corrected as shown below:

In the Specification

In Column 1, Line 8, delete "2013," and insert -- 2013, now Pat. No. 9,668,162, --, therefor.

In Column 7, Line 4, delete "PCTs" and insert -- PCIs --, therefor.

In Column 9, Lines 40-41, delete "extended. coverage mode" and insert
-- extended coverage mode. --, therefor.

In Column 11, Line 21, delete "time is takes" and insert -- time is taken --, therefor.

In Column 12, Line 22, delete "control unit, 504," and insert -- control unit, 505, --, therefor.

In Column 12, Line 40, delete "UE 601," and insert -- UE 600, --, therefor.

In Column 14, Line 24, delete "memory) ROM" and insert -- memory), ROM --, therefor.

Signed and Sealed this
Twenty-sixth Day of March, 2019

Andrei Iancu
*Director of the United States Patent and Trademark Office*